United States Patent Office 2,749,281
Patented June 5, 1956

2,749,281

CONTROLLING RICH OIL WITH CONSTANT KETTLE TEMPERATURE BY VARYING THE WATER CONTENT OF THE KETTLE SECTION

Bernardo J. Ferro, Jr., Bartlesville, Okla., assignor to Phillips Petroleum Company, a corporation of Delaware Application August 25, 1952, Serial No. 306,240

13 Claims. (Cl. 196—8)

This invention relates to the separation of hydrocarbons. In one aspect it relates to a method for operating a rich oil fractionator so as to improve separation between two components having successively higher or lower boiling points. In another aspect it relates to apparatus and a method controlling the operation of a rich absorption oil fractionator to obtain overhead products and/or kettle products of predetermined and uniform compositions.

In some prior art rich oil fractionation operations the heat or steam to the reboiler of the stripper section is controlled in response to the composition of the overhead product, its vapor pressure, etc. or in response to the composition, vapor pressure, etc. of the bottoms product. In distillation columns a portion of the condensate of the overhead vapors is usually introduced to the top tray of the column to control the end point of the overhead product. The overhead product of rich oil fractionators may be controlled by so returning a portion of the condensate from the overhead vapor. The condensation of such overhead vapors by the conventional cooling water of an industrial plant is a relatively inexpensive operation. However, to chill and condense an overhead material consisting mainly of methane and ethane is an expensive operation and is to be avoided when possible. One method of avoiding use of refrigeration in controlling such overhead products is to operate the top portion of the stripping column as an absorber and introduce a lean absorption oil similar to that used in the plant's main absorber into the top. This added lean absorbent absorbs or dissolves at least a portion of the highest boiling component or components which would otherwise pass from the column as a portion of the overhead vapors. This downflowing absorption oil then is combined with the charged rich oil at its point of introduction into the tower, which point is frequently near a midpoint vertically of the vessel. From this point on down the vessel is operated as a stripper. Reboiling heat from steam, hot oil or direct fired heater is added in order to boil off the light components from the bottom product and to supply the stripping vapors for the stripping section. Open steam is required in some cycles to lower the partial pressure of the hydrocarbons in the reboiler and, consequently, the reboiler temperature. When steam is used its rate of addition is frequently controlled by the end point of the overhead product or by the analysis of the kettle product with respect to the highest boiling material desired to be taken overhead.

Such methods of control have been found to give erratic operation.

I have devised a method for operating rich oil fractionators which provides smooth and nonvarying operation. In addition my method yields an overhead product relatively free from materials desired to be included in the kettle product while minimizing loss of overhead materials in the kettle product.

One object of my invention is to provide an improved method for operating a rich oil fractionator.

Another object of my invention is to provide a method for operating a deethanization column wherein a minimum of ethane remains in the bottoms product and a minimum of propane is included in the overhead product.

Another object of my invention is to devise a stabilizing process requiring a minimum of heat input and cooling.

Yet another object of my invention is to provide such a process which is less costly to operate than conventional processes.

As an example of my process I will describe the operation of a rich oil deethanizing fractionator embodying the principles of my invention. The following description is intended to be exemplary and in no way to limit the broad scope of my invention.

I achieve these and other objects and advantages by employing water in the kettle and adjacent portions of a deethanizing column and I control the operation of the column by controlling the concentration of the water in the kettle section of the vessel. Such a column, which may be termed a rich oil fractionator, may be advantageously operated at a constant kettle temperature and constant end compositions by controlling the amount of water withdrawn from or added to a water separating tray and/or the amount of steam added to the water separating tray or kettle.

In the drawing, Figure 1 illustrates, diagrammatically, one form of apparatus in which to carry out the process of my invention.

Figure 1:
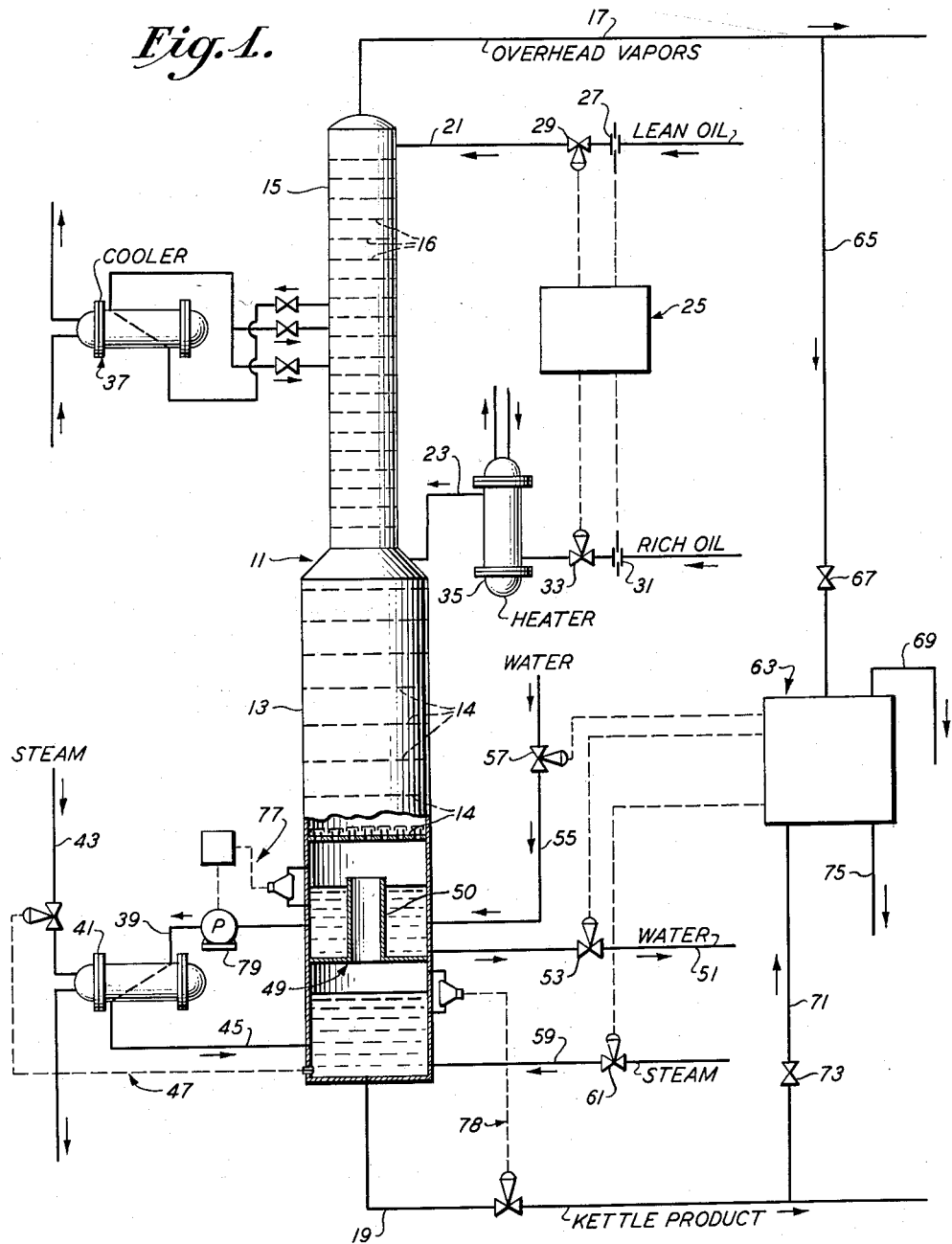

Referring now to the drawing and specifically to Figure 1, reference numeral 11 identifies a fractional distillation column. This column is divided into two sections, the upper section, identified by reference numeral 15, is an absorbing section while the lower section 13 is a stripping section. For use according to my invention the upper and absorbing section 15 is of smaller diameter than the lower or stripping section 13 since the absorbing section ordinarily treats the less quantity of material in the given length of time than the stripping section 13.

Attached to the top of this column is a line 17 which conducts overhead vapors from the top of the absorbing section to such disposal as desired, and not shown. A line 19 is connected to the bottom of the stripping section for withdrawal of kettle product and passage to such disposal as desired.

The absorbing and stripping sections of the vessel are provided with any desired and suitable type of liquid-vapor contacting apparatus such as bubble cap trays or the like.

The bubble cap trays in the absorbing section are identified by reference numeral 16 while the trays in the stripping section are identified by reference numeral 14. In the lower portion of the stripping section is a donut ring or liquid accumulation tray assembly 49. This tray has an opening in its center for passage of gases from the kettle section of the vessel to the liquid-vapor contacting sections. In commercial fractionators the cylindrical element 50 of such a donut tray as tray 49 may be three or four feet or even more in vertical length since the tray assembly 49 is intended to hold an appreciable quantity of downflowing liquid. The time of residence of this accumulated liquid is intended to be such that at least some of the water in suspension in the downflowing oil will settle to the bottom of this tray so that it may be removed as desired through a line 51. A pipe 39 is connected to the stripping section 13 in such a manner that hydrocarbon liquids or, according to my invention, absorption oil may be withdrawn therethrough. This line 39 is connected with a heat exchanger 41 to which is connected a pipe 45 for leading the absorption oil to the kettle section of the fractionating column 11. A line 43 is a line for conducting steam from a source, not shown, to the oil heater 41. Preliminary heating of the oil in line 39 may be accomplished by heat exchange between the hot lean oil from the main stripping still and the oil from the collecting tray 49, if desired. Reference numeral 47 identifies a thermocouple-motor valve assembly for controlling or regulating the flow of steam through line 43 in response to the temperature of the kettle product in the fractionating column.

A float controller assembly 77 is intended to control the operation of the pump 79 in line 39 so as to maintain the level of the liquid on tray 49 at some predetermined constant value.

A conduit 55 containing a valve 57 is connected with the stripping section 13 at a point some little distance above the point at which line 51 is connected with this vessel. A line 59 containing a valve 61 is connected with the lower portion of the kettle section of the fractionator 11.

At the upper portion of the vessel 11 is connected the line 21 containing a valve 29 and an orifice member 27. At about a mid-point of the fractionator 11 is connected the line 23 containing a heat exchanger 35, a valve 33 and an orifice member 31. Reference numeral 25 broadly is intended to refer to a ratio rate of flow controller assembly. This piece of equipment is intended to operate in such a manner as to control the flow of oil through line 21 in a definite ratio to the flow of oil through the line 23. When the rate of flow of oil through line 23 increases or decreases this ratio controller 25 increases or decreases respectively the rate of flow of the oil through line 21 in a given and predetermined ratio. Such equipment and parts are readily available from instrument supply houses.

Apparatus 37 is a cooling assembly in which a portion of the liquid flowing down the absorption section of the column may be withdrawn and cooled, and the cooled oil reintroduced into the column at a point below its point of withdrawal.

Connected to the overhead vapor line 17 is a line 65 containing a valve 67. Connected to the kettle product line 19 is a pipe 71 containing a valve 73. These pipes 65 and 71 are in turn connected with apparatus 63 which represents a product analyzer of a conventional type. This analyzer apparatus 63 may be an infrared analyzer, an ultra-violet analyzer, a gravitometer or other means of analysis which is satisfactory for analyzing such materials as may pass through line 65 or line 71. The small amount of material ordinarily used for such analytical purpose and passing through line 65 is removed from the apparatus 63 through a line 69 for such disposal as desired. In like manner the line 75 is provided for removal of the material entering apparatus 63 through line 71.

These valves 29, 33, 53, 67 and 61 are throttle type valves. By throttle type valves the applicant means that these valves are such that they may be partly opened, partly closed or fully opened or closed, depending upon operating conditions in contrast to ordinary on-off valves which valves are either fully open or fully closed.

I will describe the operation of my invention, employing the apparatus illustrated in Figure 1, for deethanizing a rich absorption oil containing methane, ethane, propane and such other higher boiling hydrocarbons as are usually found in rich absorption oils from absorbers treating wet natural gas.

A rich absorption oil containing the above mentioned dissolved hydrocarbons is introduced into the column 11 through the rich oil line 23. The temperature of this feed oil is adjusted with the heat exchanger 35 to any temperature desired. This rich absorption oil flows downward over trays 14 and the unvaporized portion accumulates in the trap 49. When the level of the liquid on trap or tray 49 reaches a predetermined high point the flow controller apparatus 77 operates the pump 79 to remove a portion of this liquid and to introduce same via heater 41 into the kettle section of the fractionator.

A liquid level control apparatus 78 controls the removal of the kettle products through line 19.

A lean absorption oil from a source, not shown, is introduced into the top of the absorbing section 15 through the line 21. The introduction of this lean absorption oil is controlled in such a manner that its rate of introduction bears a definite ratio to the rate of introduction of the rich absorption oil through line 23, the controlling of which ratio is by the ratio controller apparatus 25. This lean absorption oil flows downward over the liquid-vapor contact trays 16 and at the point of introduction of the rich absorption oil, this lean oil and the rich oil are combined and the combined stream flows on downward through the lower portion of the tower. Since the bottom of such vessels is ordinarily maintained at the highest temperature in the column, vapors pass upward through the trays 14 and it is intended that the vapors which pass upward through the absorbing section 15 will be contacted by the down flowing relatively cool lean absorption oil to redissolve and retain any hydrocarbons desired to be retained in the kettle product. For example, if the overhead product is intended to contain ethane and lighter hydrocarbons then this absorption oil flowing downward through this absorption section 15 is intended to remove propane and higher boiling hydrocarbons which may have found their way into this section of the column. Such temperatures as from about 150° to about 450° F. are ordinarily maintained in the kettle section of fractionators used as deethanizing columns. At such a temperature methane and ethane tend to be vaporized from the absorption oil and rise upward to the liquid-vapor contacting trays 14 and 16. These rising vapors carry along with them other and higher boiling hydrocarbons, which as mentioned hereintofore are intended to be absorbed in the absorption section 15. A temperature controller apparatus 47 is intended to control flow of steam through line 43 in response to the temperature of the oil in the kettle section of the column. Steam from line 43 flows through heat exchanger 41 and heats the oil in transit from the liquid accumulation tray 49 to the kettle section. In this operation it is intended that the oil in the kettle be maintained at substantially constant temperature. The stripping of ethane and lighter hydrocarbons is intended to be carried out largely by the water content of the absorption oil in this kettle portion of the column. In ordinary practice rich absorption oils ordinarily carry at least some water in solution and in suspension. In like manner, lean absorption oils ordinarily carry water in solution and in suspension. In ordinary operation the amount of water introduced into the column 11 with the lean oil and with the rich absorption oil is sufficient for the control of the stripping operations according to my invention.

I have found that at temperatures ordinarily maintained in the kettle section of deethanizing fractionators, water is remarkably soluble in the absorption oil. I have also found that the ethane content for a given kettle temperature is a function of the water content of the hydrocarbon system in the kettle. Also, that for a given ethane concentration in the kettle product, the reboiler temperature varies in inverse proportion to the water content of said kettle product. I control the amount of water in the absorption oil by withdrawing a portion of the water which separates on tray 49 through line 51 or by addition of water through line 55 as needed. As mentioned above, in ordinary operation the lean oil and the rich oil contain sufficient water for the operation of my invention and when such conditions exist water does not need to be added through line 55 nor does live steam need to be added into the reboiler through line 59.

However, under some conditions lean oils and rich absorption oils may be relatively dry and under such conditions it may be necessary to add water through line 55 or steam through line 59. When additional water is needed it is preferable to introduce steam through line 55 but when the pressure maintained in column 11 is higher than the available live steam of the plant, then it is necessary to add liquid water through line 55.

I find that when the absorption oil in the kettle contains too much water that the stripping power of the operation is increased and the propane content of the overhead vapors in line 17 in increased. When such conditions exist the analyzer apparatus 63 is intended to operate in such a manner that the throttle valve 53 is opened somewhat to permit removal of a portion of the water normally accumulating on the tray 49. If after a certain length of time the propane content of the overhead vapor flowing through line 17 does not decrease or if the propane content increases further, then the analyzer-controller-apparatus 63 operates to open the throttle valve 53 to a greater extent to permit more rapid removal of water through line 51. By removal of water through the line 51 less water is maintained in the oil accumulating in tray 49 to be added to the reboiler section by way of line 39 and 45. When the water content of the oil in the reboiler thus decreases, the stripping power of the column is reduced and less propane is removed with the overhead vapors through line 17. Thus, with less propane in line 17 the analyzer-controller apparatus 63 then operates to close partially or to throttle the valve 53 to decrease the rate of withdrawal of the water through line 51. When such an apparatus has been in operation for a period of time the analyzer-controller apparatus 63 reaches a balance between a predetermined propane content of overhead vapors and the rate of removal of water through line 51, and under such conditions the operation of the column is relatively constant. This constancy in operation is of course dependent upon constant introduction of lean oil, rich oil feed into the column, and other operating conditions.

When the rich oil and the lean oil added to the absorption section are relatively free of water, it is necessary to introduce steam through line 59 into the reboiler or water through line 55 into the liquid separation tray 49. If liquid water is introduced through line 55 into the separation tray 49 (or directly into the discharge line of pump 79) then some of this water is passed with the accumulated oil by pump 79 through line 39, heater 41 and pipe 45 into the kettle of the column. Water which enters this kettle section is intended to be completely in solution in the absorption oil so that only one liquid phase exists in the kettle and steam arising therefrom along with vaporous hydrocarbons rises through the ring 50 and upwards to the stripping section 13. In the upper sections at least some of the water will be condensed and will back flow down the column and finally accumulate in the liquid accumulation tray 49. If too much steam has been added through pipe 59 or too much water through pipe 55 then some of the accumulating water will be automatically withdrawn via pipe 51 in response to too high propane content of the overhead vapor in line 17 as indicated by the analyzer-controller apparatus 63.

Under some conditions it may be desirable to control the deethanizing operation in response to the ethane content of the kettle product. Under such conditions a small portion of the kettle product is by-passed from line 19 through line 71 into the analyzer-controller apparatus 63. Under this condition the water withdrawal through the line 51, or addition through line 55 or steam addition through line 59 are operated in accordance to the ethane content of the kettle product. I prefer however, to operate the analyzer-controller apparatus on the overhead vapors flowing through line 17.

Figure 3:
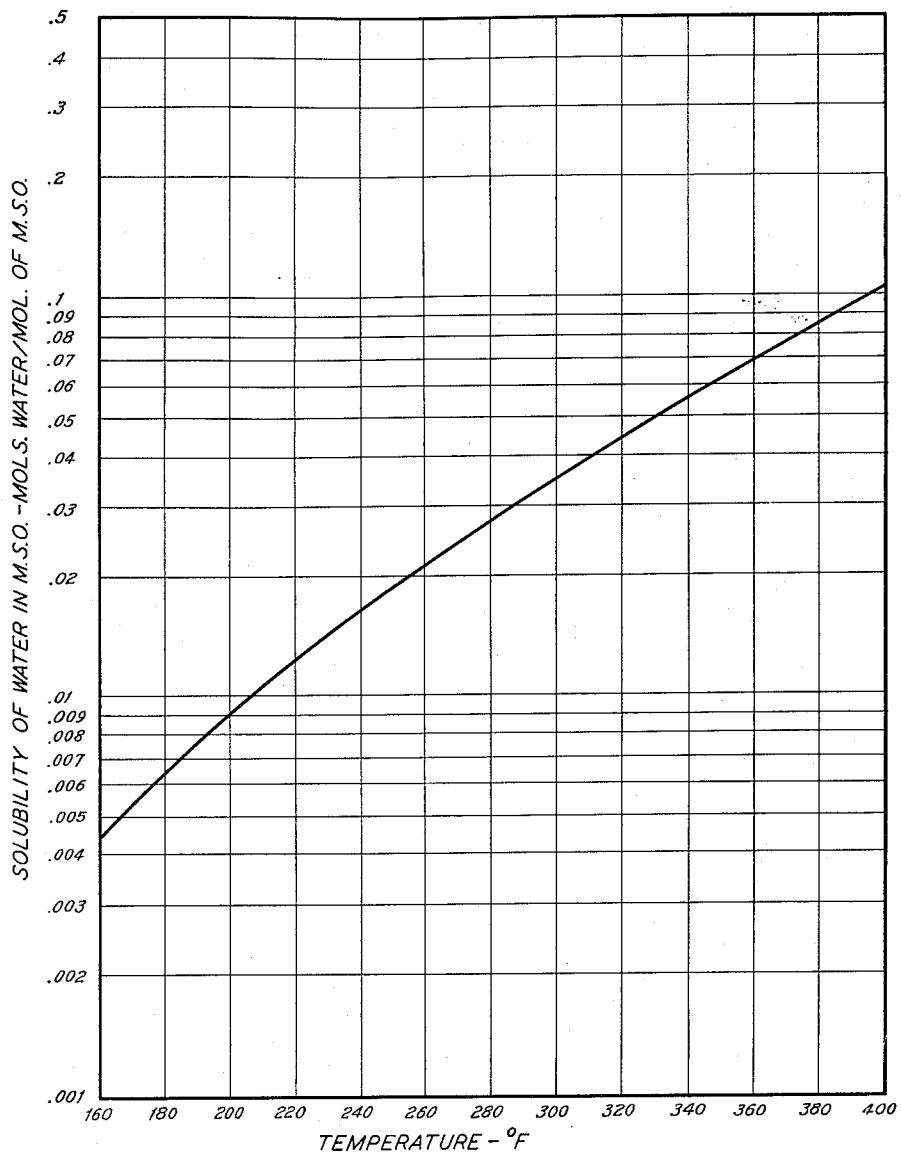
Figure 3 is a curve showing the solubility of water in mineral seal oil.

According to my invention, as mentioned above, it is intended that all emulsion or suspended water in the oil withdrawn through pipe 39 be dissolved in the oil as the oil and suspended water pass through the heater 41. It is further intended to maintain only a single liquid phase in the kettle. With only one liquid phase in the kettle, the maximum concentration of water in the kettle is that indicated by the curve showing the solubility of water in mineral seal oil (Fig. 3). For example, if the temperature of the oil-water emulsion on the separation tray 49 is 200° F., the solubility of water in the mineral seal oil is about 0.009 mol water per mol of oil. Upon emerging from the heater 41 at a temperature of 380° F., the oil can hold 0.084 mol of water in solution. By maintaining the oil in the kettle at a constant temperature, the stripping power of the water-containing oil is a function of the concentration of the solution water in the mineral seal oil, the maximum concentration of water being that shown on the solubility curve, and the minimum being zero.

If emulsion water is permitted to enter the kettle at the heater (41) outlet temperature, the stripping power of the system is greatly increased and the operation is difficult to control. Under this condition large proportions of propane appear in the overhead vapors.

According to my invention I control this fractionation operation by regulating the concentration of the solution water in the kettle.

When steam is injected into the kettle oil, the amount added is that required to provide the desired partial pressure-temperature relationship dictated by the kettle product in question. If an excess of steam over this amount were added, the excess steam would either condense as a separate water phase or would pass through the liquid separation trays 49 and 115 and on up the column. These latter conditions are reflected in an abnormally high propane content in the overhead vapors, and an abnormally low ethane content in the kettle product since the kettle contents are maintained at a constant temperature under all water concentration conditions.

As an example of the operating conditions under which my invention may be practiced a column may be maintained under a pressure from about 100 to 375 pounds per square inch gauge. The temperature of the oil in the reboiler section may be maintained between the limits of about 150° and 450° F. The lean oil may be added to the column at a temperature between about 60° and 100° F. Cool lean oil is favorable to the operation. The rich oil feed may be maintained between a temperature of about 90° and 200° F. The temperature of the overhead vapors at their point of removal from the column may ordinarily be maintained between about 65° and 110° F. As an illustration of the water content of a lean mineral seal oil which may be used according to my invention it may contain about .7 per cent water, some of which is in solution but most of which is in suspension at the lean oil introduction temperature. The rich oil may contain about 2 per cent of water, most of which is in suspension in the rich oil. Some of the suspended water from the combined lean oil and rich oil dissolves upon increase in temperature as they move downward in the column. The temperature according to my invention ordinarily maintained in the water separation tray 49 of Figure 1 is about from 100° to 250° F. A sufficient proportion of the suspended water is withdrawn through line 51 that the remainder dissolves on passing through heater 41.

The following operational conditions, feed and product streams are illustrative of my invention when deethanizing the below given rich oil:

EXAMPLE

*Feed and Product Streams-Mols*

|  | Feed, 160° F. | Lean Oil, 85° F. | Deethanized Rich Oil Bottoms | Overhead Vapors |
|---|---|---|---|---|
| Methane | 11.5 |  | .01 | 11.49 |
| Ethane | 5.5 |  | .71 | 4.79 |
| Propane | 6.3 |  | 5.47 | .83 |
| Butanes | 6.9 |  | 6.90 | 0 |
| Pentanes | 5.8 |  | 5.80 | 0 |
| MSO | 64.0 | 14.43 | 78.43 | 0 |
|  | 100.0 | 14.43 | 97.32 | 17.11 |
| Water | 2.0 | .10 | 1.99 | .08 |
|  | 102.0 | 14.53 | 99.31 | 17.19 |

Rich oil feed point—on tray No. 3 from bottom.
No. of theoretical trays, 10.
Column pressure, 180 lbs. per sq. in. abs.
Reboiler temp., 380° F.
Rich oil feed temp., 160° F.
Lean oil feed temp., 85° F.
An intercooler in the 9th plate (from reboiler) cools liquid to 90° F.
Mols water withdrawn from tray No. 1, .03 mols.
Lean oil: Rich oil ratio=14.53:102.

These above given operating conditions, etc. are given merely as an example since feed and lean oils of other compositions, other ratios of lean oil to rich oil, other temperatures and pressures may be used depending upon the results desired.

Figure 2:
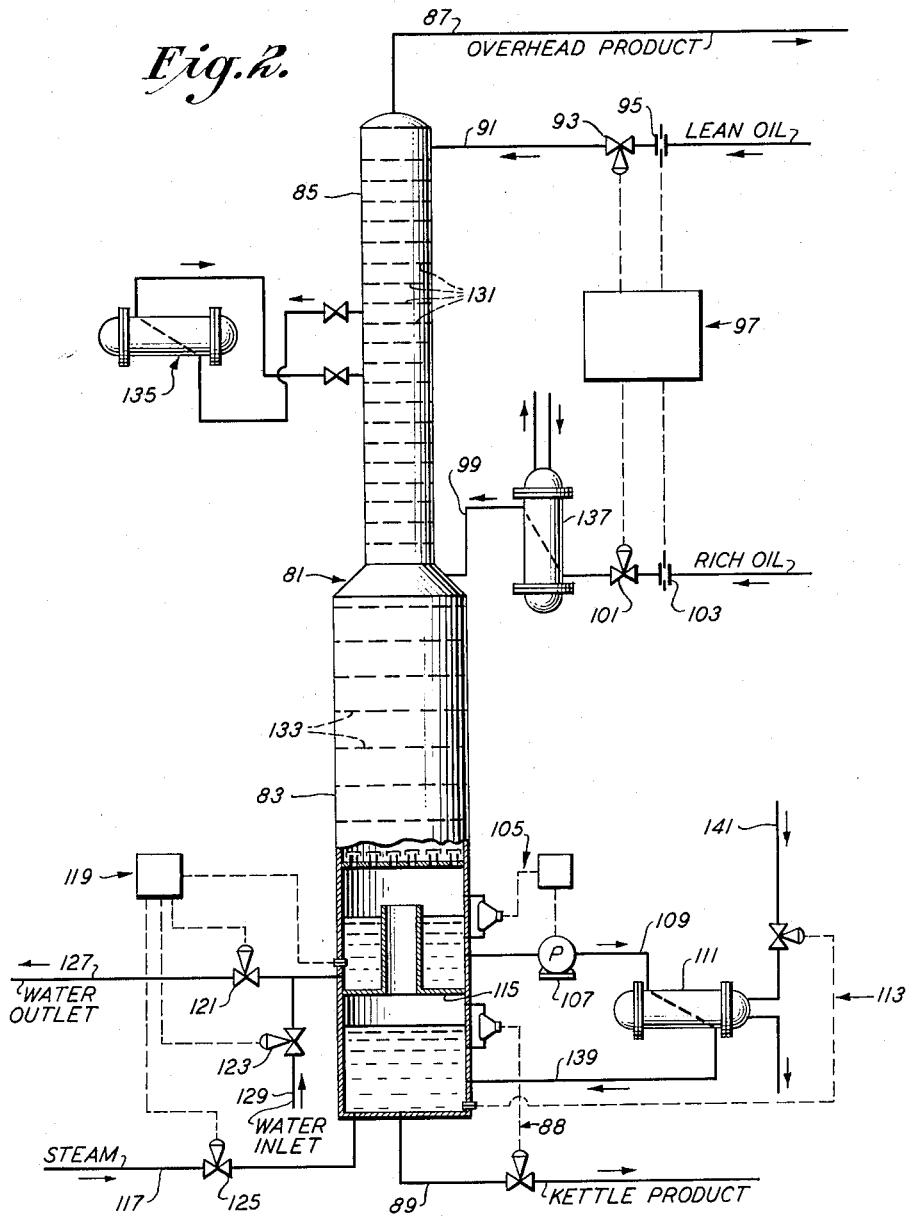
Figure 2 illustrates a second assembly of apparatus in which to carry out the process of my invention.

Referring to the embodiment illustrated in Figure 2 of the drawing the apparatus parts, for the most part, are the same or at least similar to those illustrated in Figure 1. In Figure 2 a fractionator 81 is divided into the stripping section 83 and an absorbing section 85. The absorbing section 85 contains liquid-vapor contacting trays 131 while the stripping section 83 also contains liquid-vapor contacting apparatus 133. In the lower portion of the stripping section 83, is a liquid separation tray 115, similar to tray 49 in Figure 1.

A line 87 is for removal of overhead vapor product and a line 89 is for removal of bottoms products from the column. Line 91 containing a valve 93 and an orifice 95 is for introduction of lean oil into the upper portion of the absorbing section. A line 99 containing a heat exchange 137, a valve 101 and an orifice 103 is for introduction of rich absorption oil into the column. Apparatus element 97 is a ratio rate of flow controller similar to element 25 of Figure 1. Liquid from the accumulation tray 115 is passed under the influence of pump 107 through a line 109, a heat exchanger 111 and a pipe 139 into the kettle section of the column. The liquid from tray 115 may be given a preliminary heat exchange with the hot lean oil from the still, if desired. The operation of the pump 107 is controlled in response to the level of the liquid within the column by a float controller apparatus 105. Steam for use in the heat exchanger 111 is introduced into the heat exchanger from a line 141 from the source not shown. The flow of steam through line 141 is controlled by a temperature responsive apparatus 113 which operates the valve of this steam line in response to temperatures in the kettle section of the column. Bottoms product is removed from the column through a line 89 and its removal is controlled by a float controller assembly 88 which operates in a conventional manner. A pipe 127 is for removal of water from the liquid separation tray 115. A pipe 129 is for inlet of water to this tray. The pipe 117 is for introduction of steam into the kettle section of the column. A valve 121 controls the flow of outlet water through pipe 127, valve 123 controls the flow of the inlet water flowing through pipe 129 while the valve 125 is to control the flow of steam through line 117. Apparatus element 119 is the temperature responsive flow controller apparatus which is intended to control the flow of outlet water through line 127, flow of inlet water through line 129 or flow of steam through line 117 in response to temperature of the liquid on the tray 115.

A heat exchanger apparatus 135 is provided in communication with the absorption section of the column as illustrated for cooling of the absorption oil as it flows down the column. This cooling may be carried out in a manner similar to that described above in relation to Figure 1.

I find that a deethanizing operation carried out in the apparatus of Figure 2 may be controlled in response to temperature of the liquid which accumulates on tray 115. If the temperature becomes too high in the liquid on tray 115, which condition indicates that too much stripping has occurred in the vessel, the apparatus 119 operates to open the throttle valve 121 and to permit removal of more water through the line 127. If the temperature as indicated in the apparatus 119 is too low, this element 119 operates to close the valve 121 thus decreasing the amount of water withdrawn through line 127.

In cases where insufficient water is carried into the system by the oil streams it is necessary to inject water into the tower. If the tower pressure is higher than that of the plant stream system the element 119 operates to open valve 123 and admit water through line 129 into tray 115. At any time when valve 123 is open the valve 121 is, of course, closed. When the steam pressure is higher than the tower operating pressure, steam will be used, in preference to water in the liquid state, by opening valve 125 and injecting steam directly into the kettle through line 117.

The operating conditions maintained in the deethanizing tower 81 as controlled by the temperature of the liquid in separator tray 115 are about the same as those in above in relation to Figure 1. When too much water is in solution in the absorption oil in the kettle this condition is reflected by too high a temperature of the accumulated liquid in tray 115. In like manner too little water in the reboiler absorption oil is reflected in the liquid on tray 115 by too low a temperature.

Some physical characteristics of water are such that they make my invention an easily workable operation. The equilibrium constants of water and ethane are approximately the same and so are the molal enthalpies of these liquids in the liquid phase. However, the latent heat of evaporation of ethane and water are of the order of 4,850 B. t. u. per mol of ethane and 15,240 B. t. u. per mol for water or a ratio of more than 3:1 of water to ethane. These two relationships I find afford a perfect arrangement for controlling composition of overhead and kettle products at a constant kettle temperature by regulation of the concentration of water in the kettle section of these fractionators.

My invention may be used in demethanizing operations, in depropanizing or debutanizing or for other separations as well as in the deethanizing separation as illustrated herein. The invention may also be used in stripping of one component from an absorbent containing other components in a chemical system as well as in a hydrocarbon system.

In the apparatus of both Figures 1 and 2 the water in excess of that required for kettle equilibrium builds up on the liquid separation tray above the kettle and is removed by the water withdrawal line, and the withdrawal is controlled by a valve in that line in response to an analysis of the overhead product or of a kettle product (Fig. 1) or in response to the temperature of the liquid in the liquid separation tray (Fig. 2).

If water is not present in the oil streams in a sufficient amount then an external and regulated amount of water or steam must be introduced into the deethanizer at a convenient point. Steam is more desirable and can be used in lower pressure ranges, up to plant live steam pressure. In pressures higher than available steam pressures, liquid water must be used.

I claim:

1. A method for fractionating a rich hydrocarbon absorption oil containing a plurality of constituents of unlike volatilities comprising introducing said rich absorption oil into a fractionating zone provided with vapor-liquid contacting elements, removing vaporous overhead and liquid kettle products therefrom as products of the process, introducing lean absorption oil into said zone at a level near the vaporous overhead product outlet and above the level of introduction of said rich absorption oil, introducing water into said zone, maintaining the contents of the kettle section of said zone at a predetermined constant distillation temperature, separating liquid from the lowest vapor-liquid contacting element of said zone into an oil phase and a water phase, heating the oil phase and at least a portion of the water phase to such a temperature as to maintain said constant distillation temperature in the kettle section and to dissolve said portion of the water phase in the oil phase thereby producing a single liquid phase, introducing this heated single liquid phase into the kettle section of said zone, controlling the fractionation operation by increasing and decreasing the concentration of the dissolved water in said single liquid phase at said constant temperature and removing at least one constituent of low volatility as overhead product and absorption oil lean in said one constituent as kettle product.

2. The method of claim 1 wherein the rate of introduction of lean absorption oil bears a predetermined and fixed ratio to the rate of introduction of rich absorption oil into said distillation zone.

3. In the method of claim 1 regulating the concentration of the dissolved water in the kettle product in the kettle section of said zone by introducing steam into said kettle product in response to the composition of the vaporous overhead product.

4. In the method of claim 1 increasing and decreasing the concentration of the dissolved water in said single phase by respectively adding water to and withdrawing a portion of the separated water phase from said zone.

5. In the method of claim 1 regulating the concentration of the dissolved water in the kettle product in the kettle section of said zone by increasing and decreasing the introduction of steam into said kettle product.

6. The method of claim 1 wherein the operation is a deethanizing operation and the rich absorption oil contains ethane and at least propane.

7. The method of claim 1 wherein the lean absorption oil contains at least a portion of the added water.

8. The method of claim 1 wherein the rich absorption oil contains at least a portion of the added water.

9. In the deethanizing operation of claim 6 maintaining the top of the distillation zone at a temperature between the limits of 65° and 110° F., the rich absorption oil feed temperature between the limits of 90° and 200° F., the kettle section of said zone at a temperature between the limits of 150° and 450 F., and the pressure in said zone between the limits of 100 pounds and 375 pounds per square inch gage.

10. In the method of claim 7 regulating the concentration of the dissolved water in said single liquid phase by withdrawing a portion of the separated water phase from said zone in response to the propane content of the vaporous overhead product.

11. In the method of claim 8 regulating the concentration of the dissolved water in said single liquid phase by withdrawing a portion of the separated water phase from said zone in response to the ethane content of the kettle product.

12. An apparatus for carrying out a rich absorption oil deethanizing operation comprising a fractional distillation column, a conduit in communication with the upper portion of said column for removal of overhead product, a conduit in communication with the bottom portion of said column for removal of bottoms product, a conduit in communication with said column at a point near its top for inlet of lean absorption oil and a conduit in communication with said column at about its midpoint, vertically, for inlet of rich absorption oil, this latter conduit dividing said column into an upper and absorbing section and a lower and stripping section, means for heating the kettle section of said column, a liquid collecting tray disposed in said stripping zone at a level nearer the bottom than the top thereof and above said kettle, liquid-vapor contacting means disposed throughout said column above said liquid collecting tray, a valved conduit communicating with the lower portion of said liquid collecting tray, a transfer conduit for passage of liquid from said liquid collecting tray to said bottom and kettle section of said column, said transfer conduit being provided with a heat exchanger for heating liquid in transfer, a temperature responsive element in the kettle section of said column, a temperature responsive control means connected with said temperature responsive element and with said heat exchanger for regulating flow of a heating medium through said heat exchanger, an analyzer adapted for analyzing a product of said column, and a controller operatively communicating with said analyzer and with the valve in said valved conduit for regulating removal of liquid from said liquid collecting tray in response to analysis of said product of said column.

13. An apparatus for carrying out a rich absorption oil deethanizing operation comprising a fractional distillation column, a first conduit in communication with the top of said column for removal of overhead vapors, a second conduit in communication with the kettle portion of said column for removal of bottoms product, a third conduit in communication with said column at a point near its top for inlet of lean absorption oil, a fourth conduit in communication with said column at about a midpoint, vertically, for introduction of rich absorption oil, this latter conduit dividing said column into an upper and absorbing section and a lower and stripping section, and a fifth conduit in communication with the kettle portion of said column for inlet of steam, a liquid collecting tray disposed in said stripping section at a spaced distance above said kettle portion and below a subsequently mentioned liquid-vapor contacting means, a liquid-vapor contacting means disposed in said column throughout its length above said liquid collecting tray, a first temperature responsive element mounted in the lower portion of said liquid collecting tray, a first temperature responsive control means connected with said temperature responsive element and with a valve in said fifth conduit for regulating the flow of steam therein in response to temperature in said liquid collecting tray, a transfer conduit for passage of liquid from said liquid collecting tray to the bottom and kettle section of said column, said transfer conduit being provided with a heat exchanger for heating liquid in transfer, a second temperature responsive element in the kettle section of said column, and a second temperature responsive control means connected with said second temperature responsive element and with said heat exchanger for regulating flow of a heating medium through said heat exchanger.

References Cited in the file of this patent

UNITED STATES PATENTS

| | | |
|---|---|---|
| 2,220,009 | Youker | Oct. 29, 1940 |
| 2,246,563 | Winters | June 24, 1941 |
| 2,414,371 | Fragen et al. | Jan. 14, 1947 |
| 2,487,577 | Stanley | Nov. 8, 1949 |
| 2,564,791 | Ribble | Aug. 21, 1951 |
| 2,638,437 | Ragatz | May 21, 1953 |